United States Patent
Xue et al.

(10) Patent No.: US 10,306,585 B2
(45) Date of Patent: May 28, 2019

(54) SIGNAL DETERMINING METHOD AND APPARATUS

(71) Applicant: HUAWEI TECHNOLOGIES CO., LTD., Shenzhen, Guangdong (CN)

(72) Inventors: Jiantao Xue, Beijing (CN); Yijie Li, Shenzhen (CN); Jie Cui, Shenzhen (CN); Anjian Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 4 days.

(21) Appl. No.: 15/952,840

(22) Filed: Apr. 13, 2018

(65) Prior Publication Data
US 2018/0234940 A1  Aug. 16, 2018

Related U.S. Application Data

(63) Continuation of application No. PCT/CN2015/092031, filed on Oct. 15, 2015.

(51) Int. Cl.
*H04W 64/00* (2009.01)
*H04W 28/12* (2009.01)
(Continued)

(52) U.S. Cl.
CPC ......... *H04W 64/006* (2013.01); *H04L 5/0051* (2013.01); *H04L 5/0094* (2013.01);
(Continued)

(58) Field of Classification Search
CPC ............. H04W 64/00; H04W 56/0085; H04W 56/007; H04W 56/0065; H04L 5/0051; H04L 5/0094
See application file for complete search history.

(56) References Cited

U.S. PATENT DOCUMENTS

| 2014/0308974 A1 | 10/2014 | Quan et al. |
| 2015/0103782 A1* | 4/2015 | Xu .......................... H04L 5/001 370/329 |
| 2015/0223125 A1 | 8/2015 | Lu et al. |

FOREIGN PATENT DOCUMENTS

| CN | 102595473 A | 7/2012 |
| CN | 102724699 A | 10/2012 |

(Continued)

OTHER PUBLICATIONS

International Search Report dated Jun. 21, 2016, in corresponding International Patent Application No. PCT/CN2015/092031, 4 pgs.
(Continued)

*Primary Examiner* — Said M Elnoubi
(74) *Attorney, Agent, or Firm* — Staas & Halsey LLP

(57) ABSTRACT

The present invention provides a signal determining method and an apparatus, so as to resolve a problem, in a conventional positioning method, that a signal receiving device cannot accurately determine whether a received signal is an aggregated reference signal, and consequently, positioning fails due to a relatively large error of location information obtained by means of positioning. The method is as follows: A signal receiving device may estimate, according to a TAE between at least two subcarriers used by a signal sending device to transmit a reference signal and a reference signal sent by the signal sending device on each subcarrier, an aggregated reference signal that is sent by the signal sending device and that is obtained after carrier aggregation. After receiving a signal, the signal receiving device determines whether the signal is an aggregated reference signal sent by the signal sending device.

20 Claims, 4 Drawing Sheets

```
┌─────────────────────────────────────────────────────────────┐ ~ 201
│  A signal receiving device receives configuration information sent by a signal │
│  sending device, and determines a TAE between at least two subcarriers used by │
│       the signal sending device to transmit a reference signal                 │
└─────────────────────────────────────────────────────────────┘
                              ▼                                        ~ 202
┌─────────────────────────────────────────────────────────────┐
│  The signal receiving device generates a reference signal on each of the at least │
│  two subcarriers according to reference signal configuration information in the   │
│    configuration information, and generates a first aggregated reference signal   │
│       based on the generated reference signal and the determined TAE              │
└─────────────────────────────────────────────────────────────┘
                              ▼                                        ~ 203
┌─────────────────────────────────────────────────────────────┐
│  After receiving a signal, the signal receiving device matches the signal against │
│     the first aggregated reference signal, and when the signal matches the first  │
│     aggregated reference signal, determines that the signal is a second aggregated│
│  reference signal sent by the signal sending device, where the second aggregated  │
│     reference signal is generated after the signal sending device performs carrier│
│     aggregation on the reference signal sent on each of the at least two subcarriers│
└─────────────────────────────────────────────────────────────┘
```

(51) Int. Cl.
*H04L 5/00* (2006.01)
*H04W 56/00* (2009.01)
(52) U.S. Cl.
CPC ......... *H04W 28/12* (2013.01); *H04W 56/007* (2013.01); *H04W 64/00* (2013.01)

(56) References Cited

FOREIGN PATENT DOCUMENTS

| WO | 2014/163554 A1 | 10/2014 | |
|---|---|---|---|
| WO | WO-2014163554 A1 * | 10/2014 | ........... H04L 5/0048 |

OTHER PUBLICATIONS

International Search Report dated Jun. 21, 2016 in corresponding International Patent Application No. PCT/CN2015/092031.

* cited by examiner

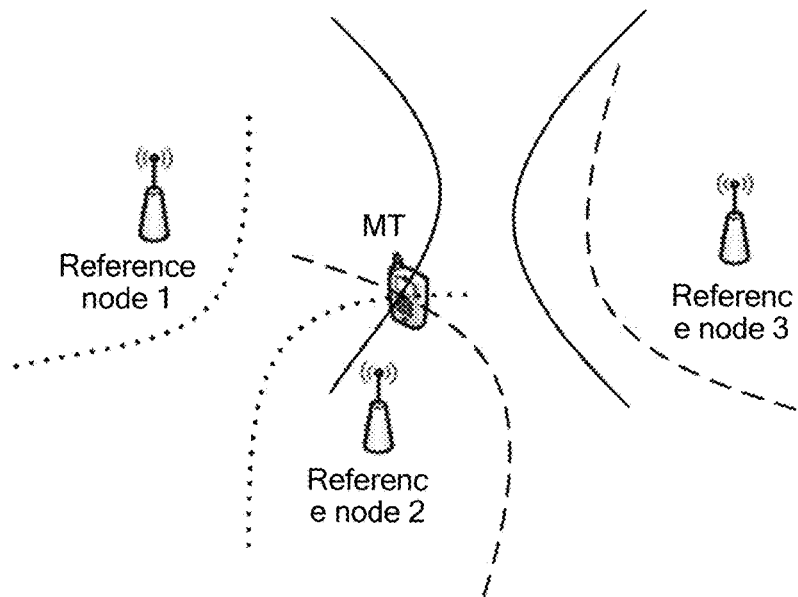

A signal receiving device receives configuration information sent by a signal sending device, and determines a TAE between at least two subcarriers used by the signal sending device to transmit a reference signal

202

The signal receiving device generates a reference signal on each of the at least two subcarriers according to reference signal configuration information in the configuration information, and generates a first aggregated reference signal based on the generated reference signal and the determined TAE

203

After receiving a signal, the signal receiving device matches the signal against the first aggregated reference signal, and when the signal matches the first aggregated reference signal, determines that the signal is a second aggregated reference signal sent by the signal sending device, where the second aggregated reference signal is generated after the signal sending device performs carrier aggregation on the reference signal sent on each of the at least two subcarriers

FIG. 2

SIGNAL DETERMINING METHOD AND APPARATUS

CROSS-REFERENCE TO RELATED APPLICATION

This application is a continuation of International Application No. PCT/CN2015/092031, filed on Oct. 15, 2015, the disclosure of which is hereby incorporated by reference in its entirety.

TECHNICAL FIELD

The present invention relates to the field of communications technologies, and in particular, to a signal determining method and an apparatus.

BACKGROUND

With development of communications services, a positioning service is important in reality as an indispensable part of mobile communications and personal communications services. The positioning service is a value-added service for obtaining location information (such as longitude and latitude coordinate information) of a mobile terminal through a network of a mobile telecommunications operator, and providing a corresponding service for a user with support of an electronic map platform.

A time difference of arrival (TDOA) technology is a currently common positioning technology. According to a principle of the technology, when one mobile terminal is positioned, three or more network nodes (such as base stations) may be used as reference nodes. Location information of each reference node is known. When the mobile terminal sends an uplink sounding reference signal (SRS) to each reference node, a location of the mobile terminal is determined according to TDOAs of the SRS on different reference nodes. Alternatively, when each reference node sends a downlink positioning reference signal (PSR) to the mobile terminal to probe a signal, a location of the mobile terminal is determined according to a TDOA of the PSR on the mobile terminal. A method for implementing positioning according to a TDOA of an uplink signal is also referred to as an uplink-time difference of arrival (UTDOA) positioning method. A method for implementing positioning according to a TDOA of a downlink signal is also referred to as an observed time difference of arrival (OTDOA) positioning method.

However, precision of location information obtained according to a TDOA of a signal is inversely proportional to bandwidth of the signal. For example, a pulse width of an ultra-wideband system signal is at a nanosecond level, and bandwidth of the signal can reach thousands of megahertz (GHz). Therefore, an error between the obtained location information and actual location information is at a centimeter level. However, bandwidth of a PSR and an SRS that are used for positioning in a current communications system is 20 megahertz (MHz), and the bandwidth is limited. Consequently, an error of location information obtained by means of positioning is relatively large, and precision is relatively low.

Conventionally, a signal may be sent by using a carrier aggregation technology, to increase bandwidth of the signal. However, an aggregated reference signal generated after carrier aggregation is performed on multiple signals has a great change in waveform when compared with the signals before the aggregation. Therefore, a signal receiving device cannot accurately determine whether a received signal is the aggregated reference signal. An error is relatively large when a transmission time of the aggregated reference signal is determined. Consequently, positioning fails due to a relatively large error of location information obtained by means of positioning.

SUMMARY

Embodiments of the present invention provide a signal determining method and an apparatus, so as to resolve a problem, in a conventional positioning method, that a signal receiving device cannot accurately determine whether a received signal is an aggregated reference signal, and consequently, positioning fails due to a relatively large error of location information obtained by means of positioning.

According to a first aspect, a signal determining method is provided, including:

receiving, by a signal receiving device, configuration information sent by a signal sending device, and determining a time alignment error (Time Alignment Error, TAE) between at least two subcarriers used by the signal sending device to transmit a reference signal, where the signal receiving device is a to-be-positioned mobile terminal or a reference node, the signal sending device is a reference node if the signal receiving device is a to-be-positioned mobile terminal, or the signal sending device is a to-be-positioned mobile terminal if the signal receiving device is a reference node, the reference node is configured to position the to-be-positioned mobile terminal, and the configuration information includes reference signal configuration information that is set for each of the at least two subcarriers;

generating, by the signal receiving device, a reference signal on each of the at least two subcarriers according to the reference signal configuration information in the configuration information, and generating a first aggregated reference signal based on the generated reference signal and the determined TAE; and after receiving a signal, matching, by the signal receiving device, the signal against the first aggregated reference signal, and when the signal matches the first aggregated reference signal, determining that the signal is a second aggregated reference signal sent by the signal sending device, where the second aggregated reference signal is generated after the signal sending device performs carrier aggregation on the reference signal sent on each of the at least two subcarriers.

With reference to the first aspect, in a first possible implementation of the first aspect, the receiving, by a signal receiving device, the configuration information sent by the signal sending device includes:

receiving, by the signal receiving device, the configuration information periodically sent by the signal sending device on each of the at least two subcarriers.

With reference to the first aspect or the first possible implementation of the first aspect, in a second possible implementation of the first aspect, the determining, by the signal receiving device, the TAE includes:

receiving, by the signal receiving device, the TAE sent by the signal sending device; or using, by the signal receiving device, a stored TAE corresponding to the signal sending device as the TAE.

With reference to the second possible implementation of the first aspect, in a third possible implementation of the first aspect, when the signal receiving device is a reference node, before the using, by the signal receiving device, a stored TAE corresponding to the signal sending device as the TAE, the method further includes:

determining, by the signal receiving device at a moment of determining location information of the signal sending device, the TAE corresponding to the signal sending device, and storing the TAE, where when location information of a transceiver that is corresponding to each of the at least two subcarriers and that is in the signal receiving device is different from location information of the signal receiving device, the determining, by the signal receiving device at a moment of determining location information of the signal sending device, the TAE corresponding to the signal sending device includes:

receiving, by the signal receiving device by using the transceiver corresponding to each of the at least two subcarriers, the reference signal sent by the signal sending device on each of the at least two subcarriers;

determining, by the signal receiving device, a transmission time of the reference signal sent on each subcarrier, and determining a distance between the transceiver corresponding to each subcarrier and the signal sending device according to the location information of the transceiver corresponding to each subcarrier and the location information of the signal sending device; and performing, by the signal receiving device, the following operations for every two subcarriers in the at least two subcarriers:

determining a time alignment error length between the two subcarriers according to transmission times of reference signals sent on the two subcarriers and a distance between a transceiver corresponding to each of the two subcarriers and the signal sending device; and determining, by the signal receiving device according to the determined time alignment error length between every two subcarriers, the TAE corresponding to the signal sending device; or when location information of a transceiver that is corresponding to each of the at least two subcarriers and that is in the signal receiving device is the same as location information of the signal receiving device, the determining, by the signal receiving device at a moment of determining location information of the signal sending device, the TAE corresponding to the signal sending device includes:

receiving, by the signal receiving device, the reference signal sent by the signal sending device on each of the at least two subcarriers;

determining, by the signal receiving device, a transmission time of the reference signal sent on each subcarrier; and performing, by the signal receiving device, the following operations for every two subcarriers in the at least two subcarriers:

using, as a time alignment error length between the two subcarriers, a transmission time difference between reference signals sent on the two subcarriers; and determining, by the signal receiving device according to the determined time alignment error length between every two subcarriers, the TAE corresponding to the signal sending device.

With reference to the third possible implementation of the first aspect, in a fourth possible implementation of the first aspect, when the location information of the transceiver that is corresponding to each of the at least two subcarriers and that is in the signal receiving device is different from the location information of the signal receiving device, the time alignment error length between the two subcarriers meets the following formula:

$$TAE_{1\_2} = (TOA_2 - TOA_1) + \frac{(n_1 - n_2) + (S_1 - S_2)}{C},$$

where $TAE_{1\_2}$ is the time alignment error length between the two subcarriers, $TOA_2$ is a transmission time of a reference signal sent on a first subcarrier in the two subcarriers, $TOA_1$ is a transmission time of a reference signal sent on a second subcarrier in the two subcarriers, $S_1$ is a distance between a transceiver corresponding to the first subcarrier and the signal sending device, $S_2$ is a distance between a transceiver corresponding to the second subcarrier and the signal sending device, C is a reference signal transmission speed, $n_1$ is an estimated distance error brought by noise of the reference signal sent on the first subcarrier, and $n_2$ is an estimated distance error brought by noise of the reference signal sent on the second subcarrier.

With reference to any one of the first aspect, or the first to the fourth possible implementations of the first aspect, in a fifth possible implementation of the first aspect, the generating, by the signal receiving device, a first aggregated reference signal based on the generated reference signal and the determined TAE includes:

generating, by the signal receiving device, the first aggregated reference signal by performing combination processing on the generated reference signal according to the TAE.

According to a second aspect, a signal determining method is provided, including:

sending, by a signal sending device to a signal receiving device, configuration information and a time alignment error TAE between at least two subcarriers used by the signal sending device to transmit a reference signal, where the signal sending device is a to-be-positioned mobile terminal or a reference node, the signal receiving device is a reference node if the signal sending device is a to-be-positioned mobile terminal, or the signal receiving device is a to-be-positioned mobile terminal if the signal sending device is a reference node, the reference node is configured to position the to-be-positioned mobile terminal, and the configuration information includes reference signal configuration information that is set for each of the at least two subcarriers;

obtaining, by the signal sending device, an aggregated reference signal by performing carrier aggregation on a reference signal sent on each of the at least two subcarriers; and sending, by the signal sending device, the aggregated reference signal to the signal receiving device.

With reference to the second aspect, in a first possible implementation of the second aspect, the sending, by a signal sending device, the configuration information to the signal receiving device includes:

periodically sending, by the signal sending device, the configuration information to the signal receiving device on each of the at least two subcarriers.

With reference to the second aspect or the first possible implementation of the second aspect, in a second possible implementation of the second aspect, before the signal sending device sends the TAE to the signal receiving device, the method further includes:

determining, by the signal sending device, the TAE.

With reference to the second possible implementation of the second aspect, in a third possible implementation of the second aspect, when the signal sending device is a to-be-positioned mobile terminal, the determining, by the signal sending device, the TAE includes:

sending, by the signal sending device, the reference signal to a node on each of the at least two subcarriers;

determining, by the signal sending device, a transmission time of the reference signal sent on each subcarrier; and performing, by the signal sending device, the following operations for every two subcarriers in the at least two subcarriers:

using, as a time alignment error length between the two subcarriers, a transmission time difference between reference signals sent on the two subcarriers; and determining, by the signal sending device, the TAE according to the determined time alignment error length between every two subcarriers.

With reference to the second possible implementation of the second aspect, in a fourth possible implementation of the second aspect, when the signal sending device is a reference node, when location information of a transceiver that is corresponding to each of the at least two subcarriers and that is in the signal sending device is different from location information of the signal sending device, the determining, by the signal sending device, the TAE includes:

sending, by the signal sending device, the reference signal to a reference mobile terminal by using the transceiver corresponding to each of the at least two subcarriers;

determining, by the signal sending device, a transmission time of the reference signal sent on each subcarrier, and determining a distance between the transceiver corresponding to each subcarrier and the reference mobile terminal according to the location information of the transceiver corresponding to each subcarrier and location information of the reference mobile terminal; and performing, by the signal sending device, the following operations for every two subcarriers in the at least two subcarriers:

determining a time alignment error length between the two subcarriers according to transmission times of reference signals sent on the two subcarriers and a distance between a transceiver corresponding to each of the two subcarriers and the reference mobile terminal; and determining, by the signal sending device, the TAE according to the determined time alignment error length between every two subcarriers; or when location information of a transceiver that is corresponding to each of the at least two subcarriers and that is in the signal sending device is the same as location information of the signal sending device, the determining, by the signal sending device, the TAE includes:

sending, by the signal sending device, the reference signal to a reference mobile terminal on each of the at least two subcarriers;

determining, by the signal sending device, a transmission time of the reference signal sent on each subcarrier; and performing, by the signal sending device, the following operations for every two subcarriers in the at least two subcarriers:

using, as a time alignment error length between the two subcarriers, a transmission time difference between reference signals sent on the two subcarriers; and determining, by the signal sending device, the TAE according to the determined time alignment error length between every two subcarriers.

With reference to the fourth possible implementation of the second aspect, in a fifth possible implementation of the second aspect, when the location information of the transceiver that is corresponding to each of the at least two subcarriers and that is in the signal sending device is different from the location information of the signal sending device, the time alignment error length between the two subcarriers meets the following formula:

$$TAE_{1\_2} = (TOA_2 - TOA_1) + \frac{(n_1 - n_2) + (S_1 - S_2)}{C},$$

where $TAE_{1\_2}$ is the time alignment error length between the two subcarriers, $TOA_2$ is a transmission time of a reference signal sent on a first subcarrier in the two subcarriers, $TOA_1$ is a transmission time of a reference signal sent on a second subcarrier in the two subcarriers, $S_1$ is a distance between a transceiver corresponding to the first subcarrier and the reference mobile terminal, $S_2$ is a distance between a transceiver corresponding to the second subcarrier and the reference mobile terminal, C is a reference signal transmission speed, $n_1$ is a distance error brought by noise of the reference signal sent on the first subcarrier, and $n_2$ is a distance error brought by noise of the reference signal sent on the second subcarrier.

According to a third aspect, a signal receiving device is provided, where the signal receiving device is a to-be-positioned mobile terminal or a reference node, and the signal receiving device includes:

a receiving unit, configured to receive configuration information sent by a signal sending device, where the signal sending device is a reference node if the signal receiving device is a to-be-positioned mobile terminal, or the signal sending device is a to-be-positioned mobile terminal if the signal receiving device is a reference node, the reference node is configured to position the to-be-positioned mobile terminal, and the configuration information includes reference signal configuration information that is set for each of the at least two subcarriers;

a determining unit, configured to determine a time alignment error TAE between the at least two subcarriers used by the signal sending device to transmit a reference signal;

a generation unit, configured to: generate a reference signal on each of the at least two subcarriers according to the reference signal configuration information in the configuration information, and generate a first aggregated reference signal based on the generated reference signal and the determined TAE; and a processing unit, configured to: after the receiving unit receives a signal, match the signal against the first aggregated reference signal, and when the signal matches the first aggregated reference signal, determine that the signal is a second aggregated reference signal sent by the signal sending device, where the second aggregated reference signal is generated after the signal sending device performs carrier aggregation on the reference signal sent on each of the at least two subcarriers.

With reference to the third aspect, in a first possible implementation of the third aspect, the receiving unit is specifically configured to:

receive the configuration information periodically sent by the signal sending device on each of the at least two subcarriers.

With reference to the third aspect or the first possible implementation of the third aspect, in a second possible implementation of the third aspect, the determining unit is specifically configured to:

determine the TAE that is sent by the signal sending device and that is received by the receiving unit; or use a stored TAE corresponding to the signal sending device as the TAE.

With reference to the second possible implementation of the third aspect, in a third possible implementation of the third aspect, when the signal receiving device is a reference node, before using the stored TAE corresponding to the signal sending device as the TAE, the determining unit is further configured to:

determine, at a moment of determining location information of the signal sending device, the TAE corresponding to the signal sending device, and store the TAE, where when location information of a transceiver that is corresponding to each of the at least two subcarriers and that is in the signal receiving device is different from location information of the signal receiving device, when determining, at the moment of determining the location information of the signal sending device, the TAE corresponding to the signal sending device, the determining unit is specifically configured to:

receive, by using the transceiver corresponding to each of the at least two subcarriers, the reference signal sent by the signal sending device on each of the at least two subcarriers;

determine a transmission time of the reference signal sent on each subcarrier, and determine a distance between the transceiver corresponding to each subcarrier and the signal sending device according to the location information of the transceiver corresponding to each subcarrier and the location information of the signal sending device; and perform the following operations for every two subcarriers in the at least two subcarriers:

determining a time alignment error length between the two subcarriers according to transmission times of reference signals sent on the two subcarriers and a distance between a transceiver corresponding to each of the two subcarriers and the signal sending device; and determining, according to the determined time alignment error length between every two subcarriers, the TAE corresponding to the signal sending device; or when location information of a transceiver that is corresponding to each of the at least two subcarriers and that is in the signal receiving device is the same as location information of the signal receiving device, when determining, at the moment of determining the location information of the signal sending device, the TAE corresponding to the signal sending device, the determining unit is specifically configured to:

receive the reference signal sent by the signal sending device on each of the at least two subcarriers;

determine a transmission time of the reference signal sent on each subcarrier; and perform the following operations for every two subcarriers in the at least two subcarriers:

using, as a time alignment error length between the two subcarriers, a transmission time difference between reference signals sent on the two subcarriers; and determining, according to the determined time alignment error length between every two subcarriers, the TAE corresponding to the signal sending device.

With reference to the third possible implementation of the third aspect, in a fourth possible implementation of the third aspect, when the location information of the transceiver that is corresponding to each of the at least two subcarriers and that is in the signal receiving device is different from the location information of the signal receiving device, the time alignment error length between the two subcarriers meets the following formula:

$$TAE_{1\_2} = (TOA_2 - TOA_1) + \frac{(n_1 - n_2) + (S_1 - S_2)}{C},$$

where $TAE_{1\_2}$ is the time alignment error length between the two subcarriers, $TOA_2$ is a transmission time of a reference signal sent on a first subcarrier in the two subcarriers, $TOA_1$ is a transmission time of a reference signal sent on a second subcarrier in the two subcarriers, $S_1$ is a distance between a transceiver corresponding to the first subcarrier and the signal sending device, $S_2$ is a distance between a transceiver corresponding to the second subcarrier and the signal sending device, C is a reference signal transmission speed, $n_1$ is an estimated distance error brought by noise of the reference signal sent on the first subcarrier, and $n_2$ is an estimated distance error brought by noise of the reference signal sent on the second subcarrier.

With reference to any one of the third aspect, or the first to the fourth possible implementations of the third aspect, in a fifth possible implementation of the third aspect, when generating the first aggregated reference signal based on the generated reference signal and the determined TAE, the generation unit is specifically configured to:

generate the first aggregated reference signal by performing combination processing on the generated reference signal according to the TAE.

According to a fourth aspect, a signal sending device is provided, where the signal sending device is a to-be-positioned mobile terminal or a reference node, and the signal sending device includes:

a sending unit, configured to send, to a signal receiving device, configuration information and a time alignment error TAE between at least two subcarriers used by the signal sending device to transmit a reference signal, where the signal receiving device is a reference node if the signal sending device is a to-be-positioned mobile terminal, or the signal receiving device is a to-be-positioned mobile terminal if the signal sending device is a reference node, the reference node is configured to position the to-be-positioned mobile terminal, and the configuration information includes reference signal configuration information that is set for each of the at least two subcarriers; and a processing unit, configured to obtain an aggregated reference signal by performing carrier aggregation on a reference signal sent on each of the at least two subcarriers, where the sending unit is further configured to send the aggregated reference signal to the signal receiving device.

With reference to the fourth aspect, in a first possible implementation of the fourth aspect, when sending the configuration information to the signal receiving device, the sending unit is specifically configured to:

periodically send the configuration information to the signal receiving device on each of the at least two subcarriers.

With reference to the fourth aspect or the first possible implementation of the fourth aspect, in a second possible implementation of the fourth aspect, the signal sending device further includes:

a determining unit, configured to determine the TAE before the sending unit sends the TAE to the signal receiving device.

With reference to the second possible implementation of the fourth aspect, in a third possible implementation of the fourth aspect, when the signal sending device is a to-be-positioned mobile terminal, the determining unit is specifically configured to:

send the reference signal to a node on each of the at least two subcarriers;

determine a transmission time of the reference signal sent on each subcarrier; and perform the following operations for every two subcarriers in the at least two subcarriers:

using, as a time alignment error length between the two subcarriers, a transmission time difference between reference signals sent on the two subcarriers; and determining the TAE according to the determined time alignment error length between every two subcarriers.

With reference to the second possible implementation of the fourth aspect, in a fourth possible implementation of the fourth aspect, when the signal sending device is a reference node, when location information of a transceiver that is corresponding to each of the at least two subcarriers and that is in the signal sending device is different from location information of the signal sending device, the determining unit is specifically configured to:

send the reference signal to a reference mobile terminal by using the transceiver corresponding to each of the at least two subcarriers;

determine a transmission time of the reference signal sent on each subcarrier, and determine a distance between the transceiver corresponding to each subcarrier and the reference mobile terminal according to the location information of the transceiver corresponding to each subcarrier and location information of the reference mobile terminal; and perform the following operations for every two subcarriers in the at least two subcarriers:

determining a time alignment error length between the two subcarriers according to transmission times of reference signals sent on the two subcarriers and a distance between a transceiver corresponding to each of the two subcarriers and the reference mobile terminal; and determining the TAE according to the determined time alignment error length between every two subcarriers; or when location information of a transceiver that is corresponding to each of the at least two subcarriers and that is in the signal sending device is the same as location information of the signal sending device, the determining unit is specifically configured to:

send the reference signal to a reference mobile terminal on each of the at least two subcarriers;

determine a transmission time of the reference signal sent on each subcarrier; and perform the following operations for every two subcarriers in the at least two subcarriers:

using, as a time alignment error length between the two subcarriers, a transmission time difference between reference signals sent on the two subcarriers; and determining the TAE according to the determined time alignment error length between every two subcarriers.

With reference to the fourth possible implementation of the fourth aspect, in a fifth possible implementation of the fourth aspect, when the location information of the transceiver that is corresponding to each of the at least two subcarriers and that is in the signal sending device is different from the location information of the signal sending device, the time alignment error length between the two subcarriers meets the following formula:

$$TAE_{1\_2} = (TOA_2 - TOA_1) + \frac{(n_1 - n_2) + (S_1 - S_2)}{C},$$

where $TAE_{1\_2}$ is the time alignment error length between the two subcarriers, $TOA_2$ is a transmission time of a reference signal sent on a first subcarrier in the two subcarriers, $TOA_1$ is a transmission time of a reference signal sent on a second subcarrier in the two subcarriers, $S_1$ is a distance between a transceiver corresponding to the first subcarrier and the reference mobile terminal, $S_2$ is a distance between a transceiver corresponding to the second subcarrier and the reference mobile terminal, C is a reference signal transmission speed, $n_1$ is a distance error brought by noise of the reference signal sent on the first subcarrier, and $n_2$ is a distance error brought by noise of the reference signal sent on the second subcarrier.

In the embodiments of the present invention, when a mobile terminal is positioned by sending a signal by using a carrier aggregation technology, the signal receiving device may estimate, according to the TAE between the at least two subcarriers used by the signal sending device to transmit a reference signal and the reference signal sent by the signal sending device on each subcarrier, an aggregated reference signal that is sent by the signal sending device and that is obtained after carrier aggregation. After receiving a signal, the signal receiving device determines, according to whether the signal matches the estimated aggregated reference signal, whether the signal is an aggregated reference signal sent by the signal sending device. In this way, the signal receiving device can accurately determine whether a received signal is an aggregated reference signal, then accurately determine a transmission time of the aggregated reference signal, and finally obtain location information with relatively high precision.

BRIEF DESCRIPTION OF DRAWINGS

FIG. 1 is a schematic diagram of a network architecture for positioning a mobile terminal according to an embodiment of the present invention;

FIG. 2 is a flowchart of a signal determining method according to an embodiment of the present invention;

DESCRIPTION OF EMBODIMENTS

Figure 3:
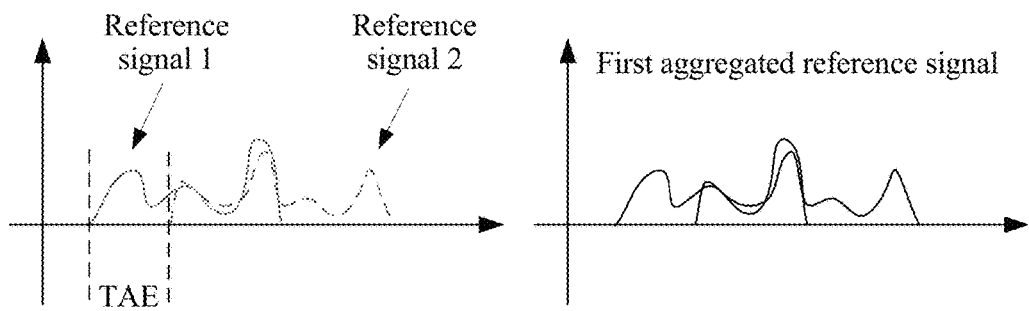
FIG. 3 is a schematic diagram of generating an aggregated reference signal by a signal receiving device according to an embodiment of the present invention.

To make the objectives, technical solutions, and advantages of the present invention clearer, the following further describes the present invention in detail with reference to the accompanying drawings. Apparently, the described embodiments are merely some rather than all of the embodiments of the present invention. All other embodiments obtained by persons of ordinary skill in the art based on the embodiments of the present invention without creative efforts shall fall within the protection scope of the present invention.

The embodiments of the present invention provide a signal determining method and an apparatus, so as to resolve a prior-art problem that a signal receiving device cannot accurately determine whether a received signal is an aggregated reference signal, and consequently, positioning fails due to a relatively large error of location information obtained by means of positioning. The method and the apparatus are based on a same inventive concept. Because problem resolving principles of the method and the apparatus are similar, mutual reference may be made to implementation of the method and the apparatus, and details are not described repeatedly.

According to the technical solutions of the present invention, when a mobile terminal is positioned by sending a signal by using a carrier aggregation technology, a signal receiving device generates a reference signal on each of at least two subcarriers according to configuration information sent by a signal sending device. The at least two subcarriers are used by the signal sending device to transmit a reference signal, and the configuration information includes reference signal configuration information that is set for each of the at least two subcarriers. The signal receiving device generates a first aggregated reference signal according to the generated reference signal and a TAE between the at least two subcarriers. After receiving a signal, the signal receiving device matches the signal against the first aggregated reference signal, and when the signal matches the first aggregated reference signal, determines that the signal is a second aggregated reference signal sent by the signal sending device. The second aggregated reference signal is generated after the signal sending device performs carrier aggregation on the reference signal sent on each of the at least two subcarriers. The signal receiving device may estimate, according to the TAE between the at least two subcarriers used by the signal sending device to transmit a reference signal and the reference signal sent by the signal sending device on each subcarrier, an aggregated reference signal that is sent by the signal sending device and that is obtained after carrier aggregation. After receiving a signal, the signal receiving device determines, according to whether the signal matches the estimated aggregated reference signal, whether the signal is an aggregated reference signal sent by the signal sending device. In this way, the signal receiving device can accurately determine whether a received signal is an aggregated reference signal, then accurately determine a transmission time of the aggregated reference signal, and finally obtain location information with relatively high precision.

An embodiment of the present invention provides a signal determining method and an apparatus applicable to a network architecture for positioning a mobile terminal by sending a signal by using a carrier aggregation technology. As shown in FIG. 1, the network architecture includes a to-be-positioned mobile terminal MT and at least three reference nodes configured for the to-be-positioned mobile terminal: a reference node 1, a reference node 2, and a reference node 3. Location information of each reference node is known.

The MT may be a handheld mobile device such as a mobile phone or a tablet computer, or may be another mobile device, and this is not limited in the present invention. Each of the reference node 1, the reference node 2, and the reference node 3 may be a base station of a macro cell, a micro cell, a pico cell, or the like, or may be an access point (AP), and this is not limited in the present invention.

When a UTDOA positioning method is used in the network architecture, the positioning method includes the following steps.

Step a1: The MT may combine reference signals on multiple carriers into one aggregated reference signal by using a carrier aggregation function.

Step a2: The MT separately sends the aggregated reference signal to the reference node 1, the reference node 2, and the reference node 3.

Step a3: The reference node 1, the reference node 2, and the reference node 3 determine transmission times of the aggregated reference signal after determining that the aggregated reference signal sent by the MT is received.

Step a4: Optionally, the reference node 1, the reference node 2, and the reference node 3 may send the respectively determined transmission times of the aggregated reference signal to the MT.

The MT determines, by using a conventional algorithm, a transmission time difference, of the aggregated reference signal sent by the MT to each reference node, between every two reference nodes according to a transmission time that is determined by each reference node and that is of the aggregated reference signal. A difference between distances from one of every two reference nodes to the MT and from the other of every two reference nodes to the MT is determined according to the transmission time difference, of the aggregated reference signal, between every two reference nodes and a reference signal transmission speed, that is, a difference between a distance from the reference node 1 to the MT and a distance from the reference node 2 to the MT, referred to as a first distance difference, a difference between a distance from the reference node 2 to the MT and a distance from the reference node 3 to the MT, referred to as a second distance difference, and a difference between a distance from the reference node 1 to the MT and a distance from the reference node 3 to the MT, referred to as a third distance difference, are determined. Finally, as shown in the figure, the MT may establish a first hyperbolic equation according to the first distance difference, location information of the reference node 1, and location information of the reference node 2, establish a second hyperbolic equation according to the second distance difference, the location information of the reference node 2, and location information of the reference node 3, and establish a third hyperbolic equation according to the third distance difference, the location information of the reference node 1, and the location information of the reference node 3. The MT determines an intersection point of the first hyperbolic equation, the second hyperbolic equation, and the third hyperbolic equation, and location information of the intersection point is location information of the MT.

Optionally, the network architecture may further include an Evolved Serving Mobile Location Center (Evolved Serving Mobile Location Center, E-SMLC). In this case, in step a4, the reference node 1, the reference node 2, and the reference node 3 may send the respectively determined transmission times of the aggregated reference signal to the E-SMLC. In a subsequent step, as described above, the E-SMLC determines, by using the same conventional algorithm used by the MT, location information of the MT according to location information of each reference node and a transmission time that is determined by each reference node and that is of the aggregated reference signal sent by the MT to each reference node, and details are not described herein again.

When an OTDOA positioning method is used in the network architecture, the positioning method includes the following steps.

Step b1: All the reference node 1, the reference node 2, and the reference node 3 may combine reference signals on multiple carriers into one aggregated reference signal by using a carrier aggregation function.

Step b2: The reference node 1, the reference node 2, and the reference node 3 separately send aggregated reference signals to the MT.

Step b3: After receiving any signal and determining that the signal is an aggregated reference signal sent by any one of the reference node 1, the reference node 2, or the reference node 3, the MT determines a transmission time of the aggregated reference signal until a transmission time of an aggregated reference signal sent by each of the reference node 1, the reference node 2, and the reference node 3 is determined.

Step b4: Like in step a4, the MT may determine, by using a conventional algorithm, location information of the MT according to location information of each reference node and the determined transmission time of the aggregated reference signal sent by each reference node to the MT. Details are not described herein again. Optionally, when the network architecture further includes an E-SMLC, the MT may send, to the E-SMLC, the transmission time of the aggregated reference signal sent by each reference node to the MT. The E-SMLC determines, by using the same conventional algorithm used by the MT, location information of the MT according to location information of each reference node and the determined transmission time of the aggregated reference signal sent by each reference node to the MT. Details are not described herein again.

An embodiment of the present invention provides a signal determining method applicable to a signal receiving device in a network architecture (for example, the network architecture shown in FIG. 1) for positioning a mobile terminal by sending a signal by using a carrier aggregation technology. As shown in FIG. 2, a specific process of the method includes the following steps.

Step 201: The signal receiving device receives configuration information sent by a signal sending device, and determines a TAE between at least two subcarriers used by the signal sending device to transmit a reference signal, where the signal receiving device is a to-be-positioned mobile terminal or a reference node, the signal sending device is a reference node if the signal receiving device is a to-be-positioned mobile terminal, or the signal sending device is a to-be-positioned mobile terminal if the signal receiving device is a reference node, the reference node is configured to position the to-be-positioned mobile terminal, and the configuration information includes reference signal configuration information that is set for each of the at least two subcarriers.

When a to-be-positioned mobile terminal is positioned by using a UTDOA positioning method in this embodiment, the to-be-positioned mobile terminal sends an aggregated reference signal to a reference node. Therefore, the signal receiving device is the reference node, and the signal sending device is the to-be-positioned mobile terminal. When the to-be-positioned mobile terminal is positioned by using an OTDOA positioning method in this embodiment, a reference node configured for the to-be-positioned mobile terminal sends an aggregated reference signal to the to-be-positioned mobile terminal. Therefore, the signal receiving device is the to-be-positioned mobile terminal, and the signal sending device is the reference node.

Optionally, that the signal receiving device receives the configuration information sent by the signal sending device includes:

receiving, by the signal receiving device, the configuration information periodically sent by the signal sending device on each of the at least two subcarriers.

Before sending an aggregated reference signal, the signal sending device needs to set the at least two subcarriers used to transmit a reference signal, and then periodically send, on each subcarrier, the reference signal configuration information that is set for the subcarrier. The reference signal configuration information is used to notify the signal receiving device of information, such as a waveform, of a reference signal sent on the subcarrier.

Optionally, the signal receiving device determines the TAE in the following two manners.

Manner 1: The signal receiving device receives the TAE sent by the signal sending device.

Manner 2: The signal receiving device uses a stored TAE corresponding to the signal sending device as the TAE.

In the second manner, the TAE that is stored by the signal receiving device and that is corresponding to the signal sending device may be previously sent by the signal sending device to the signal receiving device or determined by the signal receiving device.

Optionally, when the signal receiving device is a reference node, before the signal receiving device uses the stored TAE corresponding to the signal sending device as the TAE, the method further includes:

determining, by the signal receiving device at a moment of determining location information of the signal sending device, the TAE corresponding to the signal sending device, and storing the TAE.

In the foregoing step, optionally, the TAE corresponding to the signal sending device may be determined in the following two manners.

Manner 1: When location information of a transceiver that is corresponding to each of the at least two subcarriers and that is in the signal receiving device is different from location information of the signal receiving device, the determining, by the signal receiving device at a moment of determining location information of the signal sending device, the TAE corresponding to the signal sending device includes:

receiving, by the signal receiving device by using the transceiver corresponding to each of the at least two subcarriers, the reference signal sent by the signal sending device on each of the at least two subcarriers;

determining, by the signal receiving device, a transmission time of the reference signal sent on each subcarrier, and determining a distance between the transceiver corresponding to each subcarrier and the signal sending device according to the location information of the transceiver corresponding to each subcarrier and the location information of the signal sending device; and performing, by the signal receiving device, the following operations for every two subcarriers in the at least two subcarriers:

determining a time alignment error length between the two subcarriers according to transmission times of reference signals sent on the two subcarriers and a distance between a transceiver corresponding to each of the two subcarriers and the signal sending device; and determining, by the signal receiving device according to the determined time alignment error length between every two subcarriers, the TAE corresponding to the signal sending device.

Optionally, the time alignment error length between the two subcarriers meets the following formula:

$$TAE_{1\_2} = (TOA_2 - TOA_1) + \frac{(n_1 - n_2) + (S_1 - S_2)}{C},$$

where $TAE_{1\_2}$ is the time alignment error length between the two subcarriers, $TOA_2$ is a transmission time of a reference signal sent on a first subcarrier in the two subcarriers, $TOA_1$ is a transmission time of a reference signal sent on a second subcarrier in the two subcarriers, $S_1$ is a distance between a transceiver corresponding to the first subcarrier and the signal sending device, $S_2$ is a distance between a transceiver corresponding to the second subcarrier and the signal sending device, C is a reference signal transmission speed, $n_1$ is an estimated distance error brought by noise of the reference signal sent on the first subcarrier, and $n_2$ is an estimated distance error brought by noise of the reference signal sent on the second subcarrier.

Manner 2: When location information of a transceiver that is corresponding to each of the at least two subcarriers and that is in the signal receiving device is the same as location information of the signal receiving device, the determining, by the signal receiving device at a moment of determining location information of the signal sending device, the TAE corresponding to the signal sending device includes:

receiving, by the signal receiving device, the reference signal sent by the signal sending device on each of the at least two subcarriers;

determining, by the signal receiving device, a transmission time of the reference signal sent on each subcarrier; and performing, by the signal receiving device, the following operations for every two subcarriers in the at least two subcarriers:

using, as a time alignment error length between the two subcarriers, a transmission time difference between reference signals sent on the two subcarriers; and determining, by the signal receiving device according to the determined time alignment error length between every two subcarriers, the TAE corresponding to the signal sending device.

In the foregoing two manners, specifically, there may be multiple manners in which the signal receiving device determines, according to the determined time alignment error length between every two subcarriers, the TAE corresponding to the signal sending device, and this is not limited in the present invention. Optionally, the signal receiving device may use the time alignment error length between every two subcarriers as the TAE corresponding to the signal sending device. Alternatively, the signal receiving device may use a part of the determined time alignment error length between every two subcarriers as the TAE corresponding to the signal sending device. However, the signal receiving device may deduce the time alignment error length between every two subcarriers according to the part of the time alignment error length.

For example, when the at least two subcarriers used by the signal sending device to transmit a reference signal include a subcarrier 1, a subcarrier 2, and a subcarrier 3, the signal receiving device may determine a time alignment error length $TAE_{1\text{-}2}$ between the subcarrier 1 and the subcarrier 2, a time alignment error length $TAE_{1\text{-}3}$ between the subcarrier 1 and the subcarrier 3, and a time alignment error length $TAE_{2\text{-}3}$ between the subcarrier 2 and the subcarrier 3. In this case, the signal receiving device may use $TAE_{1\text{-}2}$, $TAE_{1\text{-}3}$, and $TAE_{2\text{-}3}$ as the TAE corresponding to the signal sending device; or the signal receiving device may use $TAE_{1\text{-}2}$ and $TAE_{1\text{-}3}$ as the TAE corresponding to the signal sending device; or the signal receiving device may use $TAE_{1\text{-}2}$ and $TAE_{2\text{-}3}$ as the TAE corresponding to the signal sending device; or the like.

Step 202: The signal receiving device generates a reference signal on each of the at least two subcarriers according to the reference signal configuration information in the configuration information, and generates a first aggregated reference signal based on the generated reference signal and the determined TAE.

Optionally, that the signal receiving device generates the first aggregated reference signal based on the generated reference signal and the determined TAE includes:

generating, by the signal receiving device, the first aggregated reference signal by performing combination processing on the generated reference signal according to the TAE.

For example, as shown in FIG. 3, when the at least two subcarriers used by the signal sending device to transmit a reference signal include a subcarrier 1 and a subcarrier 2, the signal receiving device generates a reference signal 1 on the subcarrier 1 and a reference signal 2 on the subcarrier 2 according to the reference signal configuration information in the configuration information. As shown in a left figure in FIG. 3, the signal receiving device further determines a TAE between the subcarrier 1 and the subcarrier 2. As shown in a right figure in FIG. 3, the signal receiving device generates a first aggregated reference signal by performing combination processing on the reference signal 1 and the reference signal 2 according to the TAE. For example, the signal receiving device performs corresponding delay processing on the reference signal 2 according to the TAE, and generates the first aggregated reference signal by superposing the reference signal 1 and the reference signal 2 obtained after the delay processing.

Step 203: After receiving a signal, the signal receiving device matches the signal against the first aggregated reference signal, and when the signal matches the first aggregated reference signal, determines that the signal is a second aggregated reference signal sent by the signal sending device, where the second aggregated reference signal is generated after the signal sending device performs carrier aggregation on the reference signal sent on each of the at least two subcarriers.

That the signal receiving device matches the signal against the first aggregated reference signal may include:

The signal receiving device performs correlation processing on the signal and the first aggregated reference signal to generate a correlation function, and matches the signal against the first aggregated reference signal by using the correlation function.

In step 203, after receiving the signal and determining that the signal matches the first aggregated reference signal, the signal receiving device determines that the signal is the second aggregated reference signal, and therefore, may further determine an arrival time of the second aggregated reference signal. Then a transmission time of the second aggregated reference signal is accurately determined according to the arrival time and a sending time of the second aggregated reference signal, and location information with relatively high precision is finally obtained. In step 203, the transmission time of the second aggregated reference signal may be carried in the configuration information sent by the signal sending device.

When the to-be-positioned mobile terminal is positioned by using the UTDOA positioning method in this embodiment, the signal receiving device is the reference node, and the signal sending device is the to-be-positioned mobile terminal. In this case, after step 203, the reference node sends the determined transmission time of the second aggregated reference signal to the to-be-positioned mobile terminal or an E-SMLC, so that the to-be-positioned mobile terminal or the E-SMLC determines, by using a conventional algorithm, location information of the to-be-positioned mobile terminal according to location information of each reference node and a transmission time that is determined by each reference node and that is of a second aggregated reference signal sent by the to-be-positioned mobile terminal to each reference node.

When the to-be-positioned mobile terminal is positioned by using the OTDOA positioning method in this embodiment, the signal receiving device is the to-be-positioned mobile terminal, and the signal sending device is the reference node. In this case, after the to-be-positioned mobile terminal determines, according to the foregoing method, a transmission time of a second aggregated reference signal sent by each reference node to the to-be-positioned mobile terminal, the to-be-positioned mobile terminal may directly determine, by using a conventional algorithm, location information of the to-be-positioned mobile terminal according to location information of each reference node and the determined transmission time of the second aggregated reference signal sent by each reference node to the to-be-positioned mobile terminal. Alternatively, the to-be-positioned mobile terminal sends, to an E-SMLC, the determined transmission time of the second aggregated reference signal sent by each reference node to the to-be-positioned mobile terminal, so that the E-SMLC determines, by using a conventional algorithm, location information of the to-be-positioned mobile terminal according to location information of each reference node and the transmission time of the second aggregated reference signal sent by each reference node to the to-be-positioned mobile terminal.

The location information of each reference node is known. When location information of a transceiver that is corresponding to each of the at least two subcarriers and that is in any reference node is different from location information of the reference node, the location information of the reference node may be determined according to the location information of the transceiver, or the location information of the reference node may be preset.

According to the method provided in this embodiment of the present invention, when a mobile terminal is positioned by sending a signal by using the carrier aggregation technology, the signal receiving device generates the first aggregated reference signal according to the generated reference signal on each of the at least two subcarriers used by the signal sending device to transmit a reference signal and the TAE between the at least two subcarriers, and after receiving a signal that matches the first aggregated reference signal, determines that the signal is the second aggregated reference signal sent by the signal sending device. In this way, the signal receiving device can accurately determine whether the received signal is the second aggregated reference signal sent by the signal sending device; then accurately determine the transmission time of the second aggregated reference signal, so that precision of the transmission time of the second aggregated reference signal is improved; and finally obtain location information with relatively high precision.

Figure 4:
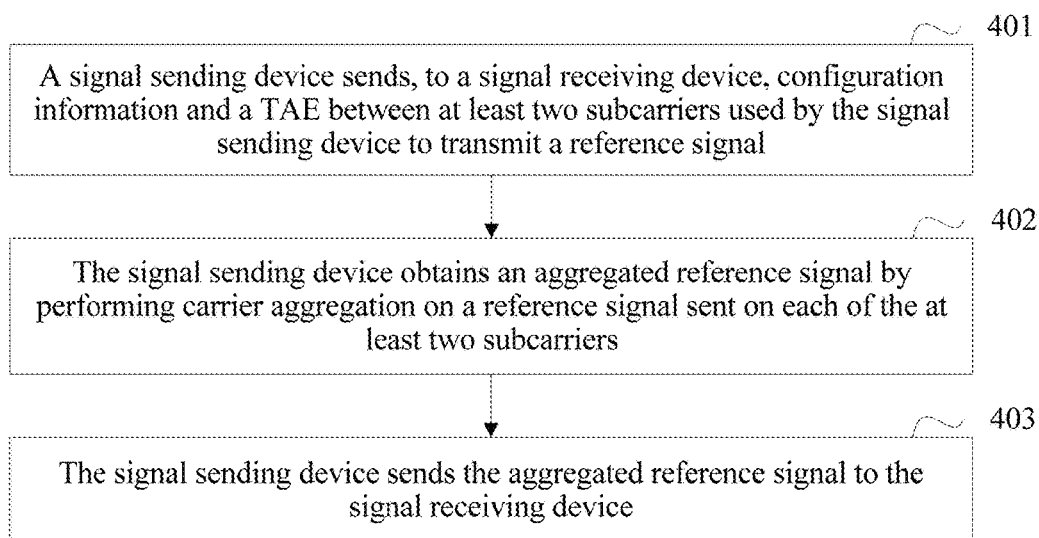
FIG. 4 is a flowchart of a signal determining method according to an embodiment of the present invention.

An embodiment of the present invention further provides a signal determining method applicable to a signal sending device in a network architecture (for example, the network architecture shown in FIG. 1) for positioning a mobile terminal by sending a signal by using a carrier aggregation technology. As shown in FIG. 4, a specific process of the method includes the following steps.

Step 401: The signal sending device sends, to a signal receiving device, configuration information and a TAE between at least two subcarriers used by the signal sending device to transmit a reference signal, where the signal sending device is a to-be-positioned mobile terminal or a reference node, the signal receiving device is a reference node if the signal sending device is a to-be-positioned mobile terminal, or the signal receiving device is a to-be-positioned mobile terminal if the signal sending device is a reference node, the reference node is configured to position the to-be-positioned mobile terminal, and the configuration information includes reference signal configuration information that is set for each of the at least two subcarriers.

Optionally, that the signal sending device sends the configuration information to the signal receiving device includes:

periodically sending, by the signal sending device, the configuration information to the signal receiving device on each of the at least two subcarriers.

Before sending an aggregated reference signal, the signal sending device needs to set the at least two subcarriers used to transmit a reference signal, and then periodically send, on each subcarrier, the reference signal configuration information that is set for the subcarrier. The reference signal configuration information is used to notify the signal receiving device of information, such as a waveform, of a reference signal sent on the subcarrier.

Optionally, before the signal sending device sends the TAE to the signal receiving device, the method further includes:

determining, by the signal sending device, the TAE.

Optionally, when the signal sending device is a to-be-positioned mobile terminal, the determining, by the signal sending device, the TAE includes:

sending, by the signal sending device, the reference signal to a node on each of the at least two subcarriers;

determining, by the signal sending device, a transmission time of the reference signal sent on each subcarrier; and performing, by the signal sending device, the following operations for every two subcarriers in the at least two subcarriers:

using, as a time alignment error length between the two subcarriers, a transmission time difference between reference signals sent on the two subcarriers; and determining, by the signal sending device, the TAE according to the determined time alignment error length between every two subcarriers.

When the to-be-positioned mobile terminal determines the TAE, the node may be any reference node or another node, and this is not limited in the present invention.

Optionally, when the signal sending device is a reference node, when location information of a transceiver that is corresponding to each of the at least two subcarriers and that is in the signal sending device is different from location information of the signal sending device, the determining, by the signal sending device, the TAE includes:

sending, by the signal sending device, the reference signal to a reference mobile terminal by using the transceiver corresponding to each of the at least two subcarriers;

determining, by the signal sending device, a transmission time of the reference signal sent on each subcarrier, and determining a distance between the transceiver corresponding to each subcarrier and the reference mobile terminal according to the location information of the transceiver corresponding to each subcarrier and location information of the reference mobile terminal; and performing, by the signal sending device, the following operations for every two subcarriers in the at least two subcarriers:

determining a time alignment error length between the two subcarriers according to transmission times of reference signals sent on the two subcarriers and a distance between a transceiver corresponding to each of the two subcarriers and the reference mobile terminal; and determining, by the signal sending device, the TAE according to the determined time alignment error length between every two subcarriers.

The time alignment error length between the two subcarriers meets the following formula:

$$TAE_{1\_2} = (TOA_2 - TOA_1) + \frac{(n_1 - n_2) + (S_1 - S_2)}{C},$$

where $TAE_{1\_2}$ is the time alignment error length between the two subcarriers, $TOA_2$ is a transmission time of a reference signal sent on a first subcarrier in the two subcarriers, $TOA_1$ is a transmission time of a reference signal sent on a second subcarrier in the two subcarriers, $S_1$ is a distance between a transceiver corresponding to the first subcarrier and the reference mobile terminal, $S_2$ is a distance between a transceiver corresponding to the second subcarrier and the reference mobile terminal, C is a reference signal transmission speed, $n_1$ is a distance error brought by noise of the reference signal sent on the first subcarrier, and $n_2$ is a distance error brought by noise of the reference signal sent on the second subcarrier.

Optionally, when the signal sending device is a reference node, when location information of a transceiver that is corresponding to each of the at least two subcarriers and that is in the signal sending device is the same as location information of the signal sending device, the determining, by the signal sending device, the TAE includes:

sending, by the signal sending device, the reference signal to a reference mobile terminal on each of the at least two subcarriers;

determining, by the signal sending device, a transmission time of the reference signal sent on each subcarrier; and performing, by the signal sending device, the following operations for every two subcarriers in the at least two subcarriers:

using, as a time alignment error length between the two subcarriers, a transmission time difference between reference signals sent on the two subcarriers; and determining, by the signal sending device, the TAE according to the determined time alignment error length between every two subcarriers.

A method for determining, by the signal sending device, the TAE in step 401 is the same as that for determining, according to the determined time alignment error length between every two subcarriers in step 201 in the foregoing embodiment, the TAE corresponding to the signal sending device. The methods each include multiple manners, and details are not described herein again.

Step 402: The signal sending device obtains an aggregated reference signal by performing carrier aggregation on a reference signal sent on each of the at least two subcarriers.

The signal sending device obtains the aggregated reference signal by performing carrier aggregation on multiple reference signals, so as to increase bandwidth of the signal and improve positioning precision.

Step 403: The signal sending device sends the aggregated reference signal to the signal receiving device.

According to this embodiment of the present invention, when a mobile terminal is positioned by sending a signal by using the carrier aggregation technology, the signal sending device sends, to the signal receiving device, the TAE between the at least two subcarriers used to transmit a reference signal, so that the signal receiving device generates a first aggregated reference signal according to the reference signal on each of the at least two subcarriers and the TAE between the at least two subcarriers, and after receiving a signal that matches the first aggregated reference signal, determines that the signal is a second aggregated reference signal sent by the signal sending device. In this way, the signal receiving device can accurately determine whether the received signal is the second aggregated reference signal sent by the signal sending device; then accurately determine a transmission time of the second aggregated reference signal, so that precision of the transmission time of the second aggregated reference signal is improved; and finally obtain location information with relatively high precision.

Figure 5:
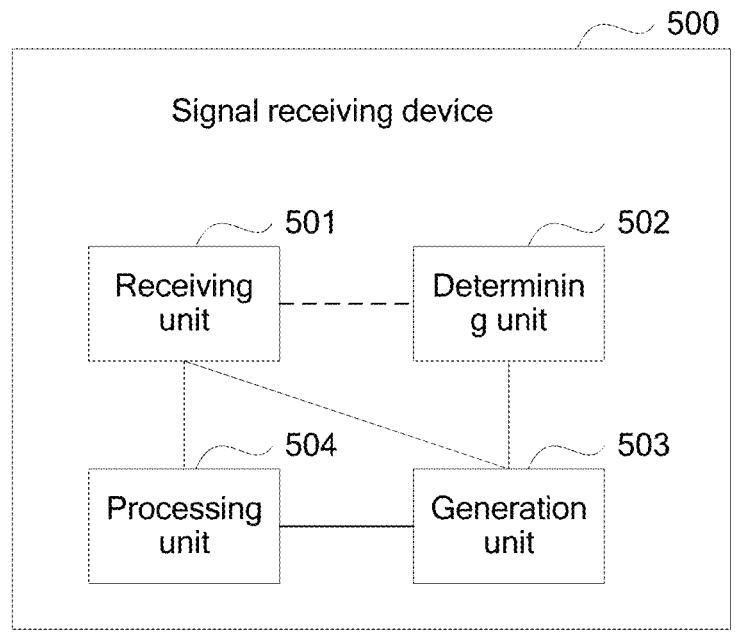
FIG. 5 is a schematic structural diagram of a signal receiving device according to an embodiment of the present invention.

Based on the foregoing embodiments, an embodiment of the present invention further provides a signal receiving device. The signal receiving device is a to-be-positioned mobile terminal or a reference node. As shown in FIG. 5, the signal receiving device 500 includes a receiving unit 501, a determining unit 502, a generation unit 503, and a processing unit 504.

The receiving unit 501 is configured to receive configuration information sent by a signal sending device, where the signal sending device is a reference node if the signal receiving device 500 is a to-be-positioned mobile terminal, or the signal sending device is a to-be-positioned mobile terminal if the signal receiving device 500 is a reference node, the reference node is configured to position the to-be-positioned mobile terminal, and the configuration information includes reference signal configuration information that is set for each of the at least two subcarriers.

The determining unit 502 is configured to determine a time alignment error TAE between the at least two subcarriers used by the signal sending device to transmit a reference signal.

The generation unit 503 is configured to: generate a reference signal on each of the at least two subcarriers according to the reference signal configuration information in the configuration information, and generate a first aggregated reference signal based on the generated reference signal and the determined TAE.

The processing unit 504 is configured to: after the receiving unit 501 receives a signal, match the signal against the first aggregated reference signal, and when the signal matches the first aggregated reference signal, determine that the signal is a second aggregated reference signal sent by the signal sending device, where the second aggregated reference signal is generated after the signal sending device performs carrier aggregation on the reference signal sent on each of the at least two subcarriers.

Optionally, the receiving unit 501 is specifically configured to:

receive the configuration information periodically sent by the signal sending device on each of the at least two subcarriers.

Optionally, the determining unit 502 is specifically configured to:

determine the TAE that is sent by the signal sending device and that is received by the receiving unit 501; or use a stored TAE corresponding to the signal sending device as the TAE.

Optionally, when the signal receiving device 500 is a reference node, before using the stored TAE corresponding to the signal sending device as the TAE, the determining unit 502 is further configured to:

determine, at a moment of determining location information of the signal sending device, the TAE corresponding to the signal sending device, and store the TAE.

When location information of a transceiver that is corresponding to each of the at least two subcarriers and that is in the signal receiving device 500 is different from location information of the signal receiving device 500, when determining, at the moment of determining the location information of the signal sending device, the TAE corresponding to the signal sending device, the determining unit 502 is specifically configured to:

receive, by using the transceiver corresponding to each of the at least two subcarriers, the reference signal sent by the signal sending device on each of the at least two subcarriers;

determine a transmission time of the reference signal sent on each subcarrier, and determine a distance between the transceiver corresponding to each subcarrier and the signal sending device according to the location information of the transceiver corresponding to each subcarrier and the location information of the signal sending device; and perform the following operations for every two subcarriers in the at least two subcarriers:

determining a time alignment error length between the two subcarriers according to transmission times of reference signals sent on the two subcarriers and a distance between a transceiver corresponding to each of the two subcarriers and the signal sending device; and determining, according to the determined time alignment error length between every two subcarriers, the TAE corresponding to the signal sending device; or when location information of a transceiver that is corresponding to each of the at least two subcarriers and that is in the signal receiving device 500 is the same as location information of the signal receiving device 500, when determining, at the moment of determining the location information of the signal sending device, the TAE corresponding to the signal sending device, the determining unit 502 is specifically configured to:

receive the reference signal sent by the signal sending device on each of the at least two subcarriers;

determine a transmission time of the reference signal sent on each subcarrier; and perform the following operations for every two subcarriers in the at least two subcarriers:

using, as a time alignment error length between the two subcarriers, a transmission time difference between reference signals sent on the two subcarriers; and determining, according to the determined time alignment error length between every two subcarriers, the TAE corresponding to the signal sending device.

Optionally, when the location information of the transceiver that is corresponding to each of the at least two subcarriers and that is in the signal receiving device 500 is different from the location information of the signal receiving device 500, the time alignment error length between the two subcarriers meets the following formula:

$$TAE_{1\_2} = (TOA_2 - TOA_1) + \frac{(n_1 - n_2) + (S_1 - S_2)}{C},$$

where $TAE_{1\_2}$ is the time alignment error length between the two subcarriers, $TOA_2$ is a transmission time of a reference signal sent on a first subcarrier in the two subcarriers, $TOA_1$ is a transmission time of a reference signal sent on a second subcarrier in the two subcarriers, $S_1$ is a distance between a transceiver corresponding to the first subcarrier and the signal sending device, $S_2$ is a distance between a transceiver corresponding to the second subcarrier and the signal sending device, C is a reference signal transmission speed, $n_1$ is an estimated distance error brought by noise of the reference signal sent on the first subcarrier, and $n_2$ is an estimated distance error brought by noise of the reference signal sent on the second subcarrier.

Optionally, when generating the first aggregated reference signal based on the generated reference signal and the determined TAE, the generation unit 503 is specifically configured to:

generate the first aggregated reference signal by performing combination processing on the generated reference signal according to the TAE.

Figure 6:
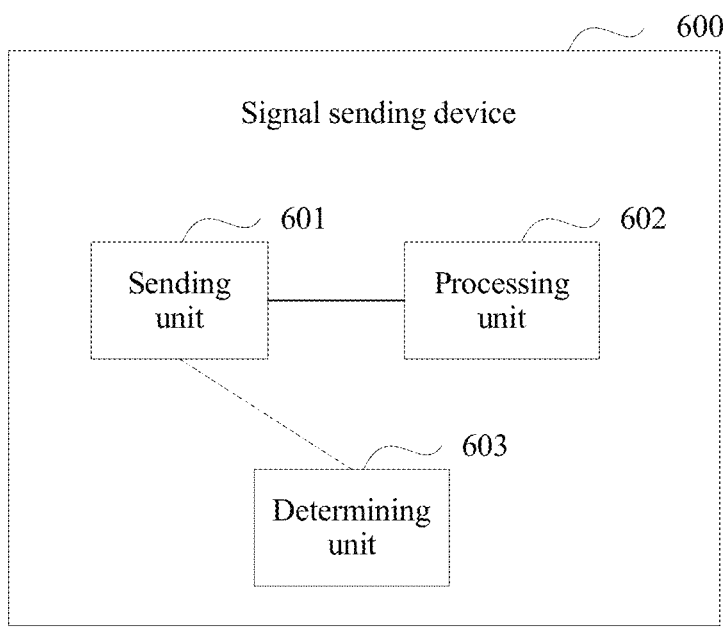
FIG. 6 is a schematic structural diagram of a signal sending device according to an embodiment of the present invention.

Based on the foregoing embodiments, an embodiment of the present invention further provides a signal sending device. The signal sending device is a to-be-positioned mobile terminal or a reference node. As shown in FIG. 6, the signal sending device 600 includes a sending unit 601 and a processing unit 602.

The sending unit 601 is configured to send, to a signal receiving device, configuration information and a time alignment error TAE between at least two subcarriers used by the signal sending device 600 to transmit a reference signal, where the signal receiving device is a reference node if the signal sending device 600 is a to-be-positioned mobile terminal, or the signal receiving device is a to-be-positioned mobile terminal if the signal sending device 600 is a reference node, the reference node is configured to position the to-be-positioned mobile terminal, and the configuration information includes reference signal configuration information that is set for each of the at least two subcarriers.

The processing unit 602 is configured to obtain an aggregated reference signal by performing carrier aggregation on a reference signal sent on each of the at least two subcarriers.

The sending unit 601 is further configured to send the aggregated reference signal to the signal receiving device.

Optionally, when sending the configuration information to the signal receiving device, the sending unit 601 is specifically configured to:

periodically send the configuration information to the signal receiving device on each of the at least two subcarriers.

Optionally, the signal sending device 600 further includes:

a determining unit 603, configured to determine the TAE before the sending unit 601 sends the TAE to the signal receiving device.

Optionally, when the signal sending device 600 is a to-be-positioned mobile terminal, the determining unit 603 is specifically configured to:

send the reference signal to a node on each of the at least two subcarriers;

determine a transmission time of the reference signal sent on each subcarrier; and perform the following operations for every two subcarriers in the at least two subcarriers:

using, as a time alignment error length between the two subcarriers, a transmission time difference between reference signals sent on the two subcarriers; and determining the TAE according to the determined time alignment error length between every two subcarriers.

Optionally, when the signal sending device 600 is a reference node, when location information of a transceiver that is corresponding to each of the at least two subcarriers and that is in the signal sending device 600 is different from location information of the signal sending device 600, the determining unit 603 is specifically configured to:

send the reference signal to a reference mobile terminal by using the transceiver corresponding to each of the at least two subcarriers;

determine a transmission time of the reference signal sent on each subcarrier, and determine a distance between the transceiver corresponding to each subcarrier and the reference mobile terminal according to the location information of the transceiver corresponding to each subcarrier and location information of the reference mobile terminal; and perform the following operations for every two subcarriers in the at least two subcarriers:

determining a time alignment error length between the two subcarriers according to transmission times of reference signals sent on the two subcarriers and a distance between a transceiver corresponding to each of the two subcarriers and the reference mobile terminal; and determining the TAE according to the determined time alignment error length between every two subcarriers; or when location information of a transceiver that is corresponding to each of the at least two subcarriers and that is in the signal sending device 600 is the same as location information of the signal sending device 600, the determining unit 603 is specifically configured to:

send the reference signal to a reference mobile terminal on each of the at least two subcarriers;

determine a transmission time of the reference signal sent on each subcarrier; and perform the following operations for every two subcarriers in the at least two subcarriers:

using, as a time alignment error length between the two subcarriers, a transmission time difference between reference signals sent on the two subcarriers; and determining the TAE according to the determined time alignment error length between every two subcarriers.

Optionally, when the location information of the transceiver that is corresponding to each of the at least two subcarriers and that is in the signal sending device 600 is different from the location information of the signal sending device 600, the time alignment error length between the two subcarriers meets the following formula:

$$TAE_{1\_2} = (TOA_2 - TOA_1) + \frac{(n_1 - n_2) + (S_1 - S_2)}{C},$$

where $TAE_{1\_2}$ is the time alignment error length between the two subcarriers, $TOA_2$ is a transmission time of a reference signal sent on a first subcarrier in the two subcarriers, $TOA_1$ is a transmission time of a reference signal sent on a second subcarrier in the two subcarriers, $S_1$ is a distance between a transceiver corresponding to the first subcarrier and the reference mobile terminal, $S_2$ is a distance between a transceiver corresponding to the second subcarrier and the reference mobile terminal, C is a reference signal transmission speed, $n_1$ is a distance error brought by noise of the reference signal sent on the first subcarrier, and $n_2$ is a distance error brought by noise of the reference signal sent on the second subcarrier.

Figure 7:
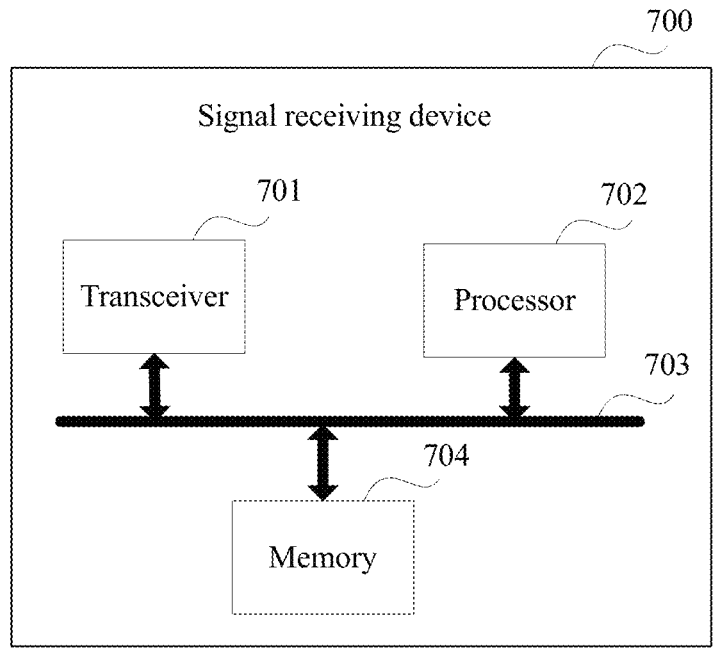
FIG. 7 is a schematic structural diagram of a signal receiving device according to an embodiment of the present invention.

Based on the foregoing embodiments, the present invention further provides a signal receiving device. The signal receiving device may use the method provided in the embodiment corresponding to FIG. 2, and may be a device the same as the signal receiving device shown in FIG. 5. The signal receiving device 700 is a to-be-positioned mobile terminal or a reference node. As shown in FIG. 7, the signal receiving device 700 includes a transceiver 701, a processor 702, a bus 703, and a memory 704.

The transceiver 701, the processor 702, and the memory 704 are interconnected by using the bus 703. The bus 703 may be a peripheral component interconnect (peripheral component interconnect, PCI for short) bus, an extended industry standard architecture (extended industry standard architecture, EISA for short) bus, or the like. The bus may be classified into an address bus, a data bus, a control bus, and the like. For ease of representation, only one bold line is used in FIG. 7 for representation, but it does not indicate that there is only one bus or one type of bus.

The transceiver 701 is configured to communicate with another device such as a signal sending device, for example, receive configuration information, an aggregated reference signal, and the like sent by the signal sending device.

The processor 702 is configured to implement the signal determining method shown in FIG. 2 in the embodiments of the present invention, and is specifically configured to:

receive configuration information sent by the signal sending device, and determine a TAE between at least two subcarriers used by the signal sending device to transmit a reference signal, where the signal sending device is a reference node if the signal receiving device 700 is a to-be-positioned mobile terminal, or the signal sending device is a to-be-positioned mobile terminal if the signal receiving device 700 is a reference node, the reference node is configured to position the to-be-positioned mobile terminal, and the configuration information includes reference signal configuration information that is set for each of the at least two subcarriers; and generate a reference signal on each of the at least two subcarriers according to the reference signal configuration information in the configuration information, and generate a first aggregated reference signal based on the generated reference signal and the determined TAE; and after a signal is received, match the signal against the first aggregated reference signal, and when the signal matches the first aggregated reference signal, determine that the signal is a second aggregated reference signal sent by the signal sending device, where the second aggregated reference signal is generated after the signal sending device performs carrier aggregation on the reference signal sent on each of the at least two subcarriers.

Optionally, that the processor 702 receives the configuration information sent by the signal sending device includes:

receiving the configuration information periodically sent by the signal sending device on each of the at least two subcarriers.

Optionally, that the processor 702 determines the TAE includes:

receiving the TAE sent by the signal sending device; or using a stored TAE corresponding to the signal sending device as the TAE.

Optionally, when the signal receiving device 700 is a reference node, before using the stored TAE corresponding to the signal sending device as the TAE, the processor 702 is further configured to:

determine, at a moment of determining location information of the signal sending device, the TAE corresponding to the signal sending device, and store the TAE, where when location information of a transceiver that is corresponding to each of the at least two subcarriers and that is in the signal receiving device 700 is different from location information of the signal receiving device 700, that the processor 702 determines, at the moment of determining the location information of the signal sending device, the TAE corresponding to the signal sending device includes:

receiving, by using the transceiver corresponding to each of the at least two subcarriers, the reference signal sent by the signal sending device on each of the at least two subcarriers;

determining a transmission time of the reference signal sent on each subcarrier, and determining a distance between the transceiver corresponding to each subcarrier and the signal sending device according to the location information of the transceiver corresponding to each subcarrier and the location information of the signal sending device; and performing the following operations for every two subcarriers in the at least two subcarriers:

determining a time alignment error length between the two subcarriers according to transmission times of reference signals sent on the two subcarriers and a distance between a transceiver corresponding to each of the two subcarriers and the signal sending device; and determining, according to the determined time alignment error length between every two subcarriers, the TAE corresponding to the signal sending device; or when location information of a transceiver that is corresponding to each of the at least two subcarriers and that is in the signal receiving device 700 is the same as location information of the signal receiving device 700, that the processor 702 determines, at the moment of determining the location information of the signal sending device, the TAE corresponding to the signal sending device includes:

receiving the reference signal sent by the signal sending device on each of the at least two subcarriers;

determining a transmission time of the reference signal sent on each subcarrier; and performing the following operations for every two subcarriers in the at least two subcarriers:

using, as a time alignment error length between the two subcarriers, a transmission time difference between reference signals sent on the two subcarriers; and determining, according to the determined time alignment error length between every two subcarriers, the TAE corresponding to the signal sending device.

Optionally, when the location information of the transceiver that is corresponding to each of the at least two subcarriers and that is in the signal receiving device 700 is different from the location information of the signal receiving device 700, the time alignment error length between the two subcarriers meets the following formula:

$$TAE_{1\_2} = (TOA_2 - TOA_1) + \frac{(n_1 - n_2) + (S_1 - S_2)}{C},$$

where $TAE_{1\_2}$ is the time alignment error length between the two subcarriers, $TOA_2$ is a transmission time of a reference signal sent on a first subcarrier in the two subcarriers, $TOA_1$ is a transmission time of a reference signal sent on a second subcarrier in the two subcarriers, $S_1$ is a distance between a transceiver corresponding to the first subcarrier and the signal sending device, $S_2$ is a distance between a transceiver corresponding to the second subcarrier and the signal sending device, C is a reference signal transmission speed, $n_1$ is an estimated distance error brought by noise of the reference signal sent on the first subcarrier, and $n_2$ is an estimated distance error brought by noise of the reference signal sent on the second subcarrier.

Optionally, that the processor 702 generates the first aggregated reference signal based on the generated reference signal and the determined TAE includes:

generating the first aggregated reference signal by performing combination processing on the generated reference signal according to the TAE.

The signal receiving device 700 further includes the memory 704, configured to store a program and the like. Specifically, the program may include program code, and the program code includes a computer operation instruction. The memory 704 may include a random access memory (random access memory, RAM), and may further include a non-volatile memory (non-volatile memory), for example, at least one magnetic disk storage. The processor 702 executes the application program stored in the memory 704, to implement the foregoing signal determining method.

Figure 8:
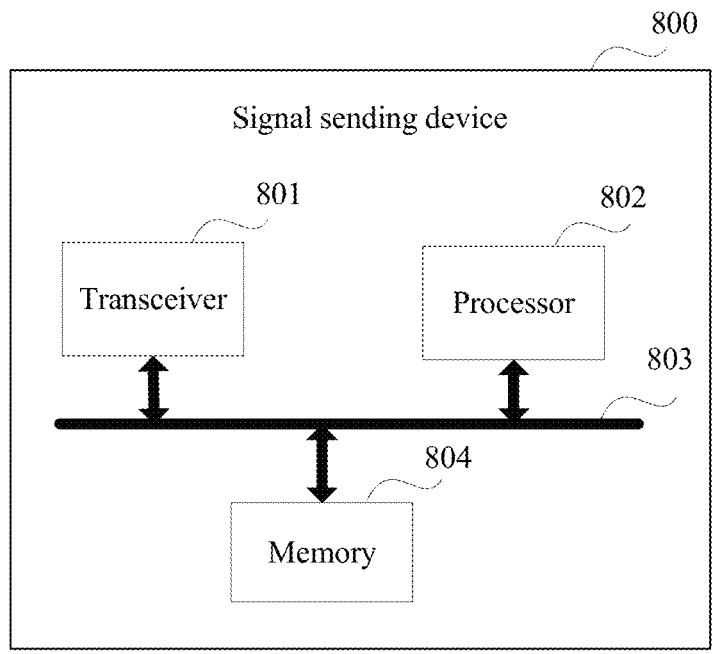
FIG. 8 is a schematic structural diagram of a signal sending device according to an embodiment of the present invention.

Based on the foregoing embodiments, the present invention further provides a signal sending device. The signal sending device may use the method provided in the embodiment corresponding to FIG. 4, and may be a device the same as the signal sending device shown in FIG. 6. The signal sending device 800 is a to-be-positioned mobile terminal or a reference node. As shown in FIG. 8, the signal sending device 800 includes a transceiver 801, a processor 802, a bus 803, and a memory 804.

The transceiver 801, the processor 802, and the memory 804 are interconnected by using the bus 803. The bus 803 may be a peripheral component interconnect (peripheral component interconnect, PCI for short) bus, an extended industry standard architecture (extended industry standard architecture, EISA for short) bus, or the like. The bus may be classified into an address bus, a data bus, a control bus, and the like. For ease of representation, only one bold line is used in FIG. 8 for representation, but it does not indicate that there is only one bus or one type of bus.

The transceiver 801 is configured to communicate with another device such as a signal receiving device, for example, send, to the signal receiving device, configuration information, a TAE between at least two subcarriers used by the signal sending device 800 to transmit a reference signal, an aggregated reference signal, and the like.

The processor 802 is configured to implement the signal determining method shown in FIG. 4 in the embodiments of the present invention, and is specifically configured to:

send, to the signal receiving device, configuration information and a TAE between at least two subcarriers used by the signal sending device 800 to transmit a reference signal, where the signal receiving device is a reference node if the signal sending device 800 is a to-be-positioned mobile terminal, or the signal receiving device is a to-be-positioned mobile terminal if the signal sending device 800 is a reference node, the reference node is configured to position the to-be-positioned mobile terminal, and the configuration information includes reference signal configuration information that is set for each of the at least two subcarriers;

obtain an aggregated reference signal by performing carrier aggregation on a reference signal sent on each of the at least two subcarriers; and send the aggregated reference signal to the signal receiving device.

Optionally, that the processor 802 sends the configuration information to the signal receiving device includes:

periodically sending the configuration information to the signal receiving device on each of the at least two subcarriers.

Optionally, before sending the TAE to the signal receiving device, the processor 802 is further configured to:

determine the TAE.

Optionally, when the signal sending device 800 is a to-be-positioned mobile terminal, that the processor 802 determines the TAE includes:

sending the reference signal to a node on each of the at least two subcarriers;

determining a transmission time of the reference signal sent on each subcarrier; and performing the following operations for every two subcarriers in the at least two subcarriers:

using, as a time alignment error length between the two subcarriers, a transmission time difference between reference signals sent on the two subcarriers; and determining the TAE according to the determined time alignment error length between every two subcarriers.

Optionally, when the signal sending device 800 is a reference node, when location information of a transceiver that is corresponding to each of the at least two subcarriers and that is in the signal sending device 800 is different from location information of the signal sending device 800, that the processor 802 determines the TAE includes:

sending the reference signal to a reference mobile terminal by using the transceiver corresponding to each of the at least two subcarriers;

determining a transmission time of the reference signal sent on each subcarrier, and determining a distance between the transceiver corresponding to each subcarrier and the reference mobile terminal according to the location information of the transceiver corresponding to each subcarrier and location information of the reference mobile terminal; and performing the following operations for every two subcarriers in the at least two subcarriers:

determining a time alignment error length between the two subcarriers according to transmission times of reference signals sent on the two subcarriers and a distance between a transceiver corresponding to each of the two subcarriers and the reference mobile terminal; and determining the TAE according to the determined time alignment error length between every two subcarriers; or when location information of a transceiver that is corresponding to each of the at least two subcarriers and that is in the signal sending device 800 is the same as location information of the signal sending device 800, that the processor 802 determines the TAE includes:

sending the reference signal to a reference mobile terminal on each of the at least two subcarriers;

determining a transmission time of the reference signal sent on each subcarrier; and performing the following operations for every two subcarriers in the at least two subcarriers:

using, as a time alignment error length between the two subcarriers, a transmission time difference between reference signals sent on the two subcarriers; and determining the TAE according to the determined time alignment error length between every two subcarriers.

Optionally, when the location information of the transceiver that is corresponding to each of the at least two subcarriers and that is in the signal sending device 800 is different from the location information of the signal sending device 800, the time alignment error length between the two subcarriers meets the following formula:

$$TAE_{1\_2} = (TOA_2 - TOA_1) + \frac{(n_1 - n_2) + (S_1 - S_2)}{C},$$

where $TAE_{1\_2}$ is the time alignment error length between the two subcarriers, $TOA_2$ is a transmission time of a reference signal sent on a first subcarrier in the two subcarriers, $TOA_1$ is a transmission time of a reference signal sent on a second subcarrier in the two subcarriers, $S_1$ is a distance between a transceiver corresponding to the first subcarrier and the reference mobile terminal, $S_2$ is a distance between a transceiver corresponding to the second subcarrier and the reference mobile terminal, C is a reference signal transmission speed, $n_1$ is a distance error brought by noise of the reference signal sent on the first subcarrier, and $n_2$ is a distance error brought by noise of the reference signal sent on the second subcarrier.

The signal sending device 800 further includes the memory 804, configured to store a program and the like. Specifically, the program may include program code, and the program code includes a computer operation instruction. The memory 804 may include a random access memory (random access memory, RAM), and may further include a non-volatile memory (non-volatile memory), for example, at least one magnetic disk storage. The processor 802 executes the application program stored in the memory 804, to implement the foregoing signal determining method.

In conclusion, according to the signal determining method and the apparatus provided in the embodiments of the present invention, when a mobile terminal is positioned by sending a signal by using the carrier aggregation technology, the signal receiving device may estimate, according to the TAE between the at least two subcarriers used by the signal sending device to transmit a reference signal and the reference signal sent by the signal sending device on each subcarrier, the aggregated reference signal that is sent by the signal sending device and that is obtained after carrier aggregation. After receiving a signal, the signal receiving device determines, according to whether the signal matches the estimated aggregated reference signal, whether the signal is an aggregated reference signal sent by the signal sending device. In this way, the signal receiving device can accurately determine whether a received signal is an aggregated reference signal, then accurately determine a transmission time of the aggregated reference signal, and finally obtain location information with relatively high precision.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may be stored in a computer readable memory that can instruct the computer or the another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of the present invention have been described, persons skilled in the art can make changes and modifications to these embodiments provided that they learn the basic inventive concept. Therefore, the following claims are intended to be construed as to cover the embodiments and all changes and modifications falling within the scope of the present invention.

Obviously, persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. A signal determining method, comprising:
    receiving, by a signal receiving device, configuration information sent by a signal sending device, and determining a time alignment error (TAE) between at least two subcarriers used by the signal sending device to transmit a reference signal, wherein the signal receiving device is a to-be-positioned mobile terminal or a reference node, the signal sending device is a reference node if the signal receiving device is a to-be-positioned mobile terminal, or the signal sending device is a to-be-positioned mobile terminal if the signal receiving device is a reference node, the reference node is configured to position the to-be-positioned mobile terminal, and the configuration information comprises reference signal configuration information that is set for each of the at least two subcarriers;
    generating, by the signal receiving device, a reference signal on each of the at least two subcarriers according to the reference signal configuration information in the configuration information, and generating a first aggregated reference signal based on the generated reference signal and the determined TAE;
    after receiving a signal, matching, by the signal receiving device, the signal against the first aggregated reference signal, and when the signal matches the first aggregated reference signal, determining that the signal is a second aggregated reference signal sent by the signal sending device, wherein the second aggregated reference signal is generated after the signal sending device performs carrier aggregation on the reference signal sent on each of the at least two subcarriers;
    determining a transmission time of the aggregated reference signal; and
    obtaining location information of the mobile terminal.

2. The method according to claim 1, wherein the receiving, by a signal receiving device, the configuration information sent by the signal sending device comprises:
    receiving, by the signal receiving device, the configuration information periodically sent by the signal sending device on each of the at least two subcarriers.

3. The method according to claim 1, wherein the determining, by the signal receiving device, the TAE comprises:
    receiving, by the signal receiving device, the TAE sent by the signal sending device; or
    using, by the signal receiving device, a stored TAE corresponding to the signal sending device as the TAE.

4. The method according to claim 3, wherein when the signal receiving device is a reference node, before the using, by the signal receiving device, a stored TAE corresponding to the signal sending device as the TAE, the method further comprises:
    determining, by the signal receiving device at a moment of determining location information of the signal sending device, the TAE corresponding to the signal sending device, and storing the TAE, wherein
    when location information of a transceiver that is corresponding to each of the at least two subcarriers and that is in the signal receiving device is different from location information of the signal receiving device, the determining, by the signal receiving device at a moment of determining location information of the signal sending device, the TAE corresponding to the signal sending device comprises:
    receiving, by the signal receiving device by using the transceiver corresponding to each of the at least two subcarriers, the reference signal sent by the signal sending device on each of the at least two subcarriers;

determining, by the signal receiving device, a transmission time of the reference signal sent on each subcarrier, and determining a distance between the transceiver corresponding to each subcarrier and the signal sending device according to the location information of the transceiver corresponding to each subcarrier and the location information of the signal sending device; and performing, by the signal receiving device, the following operations for every two subcarriers in the at least two subcarriers:

determining a time alignment error length between the two subcarriers according to transmission times of reference signals sent on the two subcarriers and a distance between a transceiver corresponding to each of the two subcarriers and the signal sending device; and determining, by the signal receiving device according to the determined time alignment error length between every two subcarriers, the TAE corresponding to the signal sending device; or when location information of a transceiver that is corresponding to each of the at least two subcarriers and that is in the signal receiving device is the same as location information of the signal receiving device, the determining, by the signal receiving device at a moment of determining location information of the signal sending device, the TAE corresponding to the signal sending device comprises:

receiving, by the signal receiving device, the reference signal sent by the signal sending device on each of the at least two subcarriers;

determining, by the signal receiving device, a transmission time of the reference signal sent on each subcarrier; and performing, by the signal receiving device, the following operations for every two subcarriers in the at least two subcarriers:

using, as a time alignment error length between the two subcarriers, a transmission time difference between reference signals sent on the two subcarriers; and determining, by the signal receiving device according to the determined time alignment error length between every two subcarriers, the TAE corresponding to the signal sending device.

5. The method according to claim 1, wherein the generating, by the signal receiving device, a first aggregated reference signal based on the generated reference signal and the determined TAE comprises:

generating, by the signal receiving device, the first aggregated reference signal by performing combination processing on the generated reference signal according to the TAE.

6. A signal determining method, comprising:

sending, by a signal sending device to a signal receiving device, configuration information and a time alignment error (TAE) between at least two subcarriers used by the signal sending device to transmit a reference signal, wherein the signal sending device is a to-be-positioned mobile terminal or a reference node, the signal receiving device is a reference node if the signal sending device is a to-be-positioned mobile terminal, or the signal receiving device is a to-be-positioned mobile terminal if the signal sending device is a reference node, the reference node is configured to position the to-be-positioned mobile terminal, and the configuration information comprises reference signal configuration information that is set for each of the at least two subcarriers;

obtaining, by the signal sending device, an aggregated reference signal by performing carrier aggregation on a reference signal sent on each of the at least two subcarriers; and sending, by the signal sending device, the aggregated reference signal to the signal receiving device;

generating, by a signal receiving device, a reference signal on each of the at least two subcarriers according to the reference signal configuration information in the configuration information, and generating a first aggregated reference signal based on the generated reference signal and the determined TAE;

after receiving a signal, matching, by the signal receiving device, the signal against the first aggregated reference signal, and when the signal matches the first aggregated reference signal, determining that the signal is a second aggregated reference signal sent by the signal sending device, wherein the second aggregated reference signal is generated after the signal sending device performs carrier aggregation on the reference signal sent on each of the at least two subcarriers;

determining a transmission time of the appreciated reference signal; and obtaining location information of the mobile terminal.

7. The method according to claim 6, wherein the sending, by a signal sending device, the configuration information to the signal receiving device comprises:

periodically sending, by the signal sending device, the configuration information to the signal receiving device on each of the at least two subcarriers.

8. The method according to claim 6, wherein before the signal sending device sends the TAE to the signal receiving device, the method further comprises:

determining, by the signal sending device, the TAE.

9. The method according to claim 8, wherein when the signal sending device is a to-be-positioned mobile terminal, the determining, by the signal sending device, the TAE comprises:

sending, by the signal sending device, the reference signal to a node on each of the at least two subcarriers;

determining, by the signal sending device, a transmission time of the reference signal sent on each subcarrier; and performing, by the signal sending device, the following operations for every two subcarriers in the at least two subcarriers:

using, as a time alignment error length between the two subcarriers, a transmission time difference between reference signals sent on the two subcarriers; and determining, by the signal sending device, the TAE according to the determined time alignment error length between every two subcarriers.

10. The method according to claim 8, wherein when the signal sending device is a reference node, when location information of a transceiver that is corresponding to each of the at least two subcarriers and that is in the signal sending device is different from location information of the signal sending device, the determining, by the signal sending device, the TAE comprises:

sending, by the signal sending device, the reference signal to a reference mobile terminal by using the transceiver corresponding to each of the at least two subcarriers;

determining, by the signal sending device, a transmission time of the reference signal sent on each subcarrier, and determining a distance between the transceiver corresponding to each subcarrier and the reference mobile terminal according to the location information of the transceiver corresponding to each subcarrier and location information of the reference mobile terminal; and performing, by the signal sending device, the following operations for every two subcarriers in the at least two subcarriers:

determining a time alignment error length between the two subcarriers according to transmission times of reference signals sent on the two subcarriers and a distance between a transceiver corresponding to each of the two subcarriers and the reference mobile terminal; and determining, by the signal sending device, the TAE according to the determined time alignment error length between every two subcarriers; or when location information of a transceiver that is corresponding to each of the at least two subcarriers and that is in the signal sending device is the same as location information of the signal sending device, the determining, by the signal sending device, the TAE comprises:

sending, by the signal sending device, the reference signal to a reference mobile terminal on each of the at least two subcarriers;

determining, by the signal sending device, a transmission time of the reference signal sent on each subcarrier; and performing, by the signal sending device, the following operations for every two subcarriers in the at least two subcarriers:

using, as a time alignment error length between the two subcarriers, a transmission time difference between reference signals sent on the two subcarriers; and determining, by the signal sending device, the TAE according to the determined time alignment error length between every two subcarriers.

11. A signal receiving device, wherein the signal receiving device is a to-be-positioned mobile terminal or a reference node, and the signal receiving device comprises:

a receiver, configured to receive configuration information sent by a signal sending device, wherein the signal sending device is a reference node if the signal receiving device is a to-be-positioned mobile terminal, or the signal sending device is a to-be-positioned mobile terminal if the signal receiving device is a reference node, the reference node is configured to position the to-be-positioned mobile terminal, and the configuration information comprises reference signal configuration information that is set for each of the at least two subcarriers;

a processor configured to:

determine a time alignment error (TAE) between the at least two subcarriers used by the signal sending device to transmit a reference signal;

generate a reference signal on each of the at least two subcarriers according to the reference signal configuration information in the configuration information, and generate a first aggregated reference signal based on the generated reference signal and the determined TAE;

after the receiver receives a signal, match the signal against the first aggregated reference signal, and when the signal matches the first aggregated reference signal, determine that the signal is a second aggregated reference signal sent by the signal sending device, wherein the second aggregated reference signal is generated after the signal sending device performs carrier aggregation on the reference signal sent on each of the at least two subcarriers;

determining a transmission time of the appreciated reference signal; and obtaining location information of the mobile terminal.

12. The signal receiving device according to claim 11, wherein receiver is configured to:

receive the configuration information periodically sent by the signal sending device on each of the at least two subcarriers.

13. The signal receiving device according to claim 11, wherein processor is configured to:

determine the TAE that is sent by the signal sending device and that is received by the receiver; or use a stored TAE corresponding to the signal sending device as the TAE.

14. The signal receiving device according to claim 13, wherein when the signal receiving device is a reference node, before using the stored TAE corresponding to the signal sending device as the TAE, the processor is further configured to:

determine, at a moment of determining location information of the signal sending device, the TAE corresponding to the signal sending device, and store the TAE, wherein when location information of a transceiver that is corresponding to each of the at least two subcarriers and that is in the signal receiving device is different from location information of the signal receiving device, when determining, at the moment of determining the location information of the signal sending device, the TAE corresponding to the signal sending device, the processor is configured to:

receive, by using the transceiver corresponding to each of the at least two subcarriers, the reference signal sent by the signal sending device on each of the at least two subcarriers;

determine a transmission time of the reference signal sent on each subcarrier, and determine a distance between the transceiver corresponding to each subcarrier and the signal sending device according to the location information of the transceiver corresponding to each subcarrier and the location information of the signal sending device; and perform the following operations for every two subcarriers in the at least two subcarriers:

determining a time alignment error length between the two subcarriers according to transmission times of reference signals sent on the two subcarriers and a distance between a transceiver corresponding to each of the two subcarriers and the signal sending device; and determining, according to the determined time alignment error length between every two subcarriers, the TAE corresponding to the signal sending device; or when location information of a transceiver that is corresponding to each of the at least two subcarriers and that is in the signal receiving device is the same as location information of the signal receiving device, when determining, at the moment of determining the location information of the signal sending device, the TAE corresponding to the signal sending device, the processor is configured to:

receive the reference signal sent by the signal sending device on each of the at least two subcarriers;

determine a transmission time of the reference signal sent on each subcarrier; and perform the following operations for every two subcarriers in the at least two subcarriers:
using, as a time alignment error length between the two subcarriers, a transmission time difference between reference signals sent on the two subcarriers; and
determining, according to the determined time alignment error length between every two subcarriers, the TAE corresponding to the signal sending device.

15. The signal receiving device according to claim 11, wherein when generating the first aggregated reference signal based on the generated reference signal and the determined (TAE), the processor is configured to:
generate the first aggregated reference signal by performing combination processing on the generated reference signal according to the TAE.

16. A signal sending device, wherein the signal sending device is a to-be-positioned mobile terminal or a reference node, and the signal sending device comprises:
a transmitter, configured to send, to a signal receiving device, configuration information and a time alignment error TAE between at least two subcarriers used by the signal sending device to transmit a reference signal, wherein the signal receiving device is a reference node if the signal sending device is a to-be-positioned mobile terminal, or the signal receiving device is a to-be-positioned mobile terminal if the signal sending device is a reference node, the reference node is configured to position the to-be-positioned mobile terminal, and the configuration information comprises reference signal configuration information that is set for each of the at least two subcarriers; and
a processor, configured to obtain an aggregated reference signal by performing carrier aggregation on a reference signal sent on each of the at least two subcarriers;
generate a reference signal on each of the at least two subcarriers according to the reference signal configuration information in the configuration information, and generate a first aggregated reference signal based on the generated reference signal and the determined TAE;
after receiving a signal, matching, the signal against the first aggregated reference signal, and when the signal matches the first aggregated reference signal, determining that the signal is a second aggregated reference signal, wherein the second aggregated reference signal is generated after the signal sending device performs carrier aggregation on the reference signal sent on each of the at least two subcarriers;
determining a transmission time of the aggregated reference signal; and
obtaining location information of the mobile terminal, wherein
the transmitter is further configured to send the aggregated reference signal to the signal receiving device.

17. The signal sending device according to claim 16, wherein when sending the configuration information to the signal receiving device, the transmitter is configured to:
periodically send the configuration information to the signal receiving device on each of the at least two subcarriers.

18. The signal sending device according to claim 16, wherein the
processor is further configured to determine the TAE before the transmitter sends the TAE to the signal receiving device.

19. The signal sending device according to claim 18, wherein when the signal sending device is a to-be-positioned mobile terminal, processor is configured to:
send the reference signal to a node on each of the at least two subcarriers;
determine a transmission time of the reference signal sent on each subcarrier; and
perform the following operations for every two subcarriers in the at least two subcarriers:
using, as a time alignment error length between the two subcarriers, a transmission time difference between reference signals sent on the two subcarriers; and
determining the TAE according to the determined time alignment error length between every two subcarriers.

20. The signal sending device according to claim 18, wherein when the signal sending device is a reference node, when location information of a transceiver that is corresponding to each of the at least two subcarriers and that is in the signal sending device is different from location information of the signal sending device, the processor is configured to:
send the reference signal to a reference mobile terminal by using the transceiver corresponding to each of the at least two subcarriers;
determine a transmission time of the reference signal sent on each subcarrier, and determine a distance between the transceiver corresponding to each subcarrier and the reference mobile terminal according to the location information of the transceiver corresponding to each subcarrier and location information of the reference mobile terminal; and
perform the following operations for every two subcarriers in the at least two subcarriers:
determining a time alignment error length between the two subcarriers according to transmission times of reference signals sent on the two subcarriers and a distance between a transceiver corresponding to each of the two subcarriers and the reference mobile terminal; and
determining the TAE according to the determined time alignment error length between every two subcarriers; or
when location information of a transceiver that is corresponding to each of the at least two subcarriers and that is in the signal sending device is the same as location information of the signal sending device, the processor is configured to:
send the reference signal to a reference mobile terminal on each of the at least two subcarriers;
determine a transmission time of the reference signal sent on each subcarrier; and
perform the following operations for every two subcarriers in the at least two subcarriers:
using, as a time alignment error length between the two subcarriers, a transmission time difference between reference signals sent on the two subcarriers; and
determining the TAE according to the determined time alignment error length between every two subcarriers.

* * * * *

UNITED STATES PATENT AND TRADEMARK OFFICE
CERTIFICATE OF CORRECTION

PATENT NO. : 10,306,585 B2
APPLICATION NO. : 15/952840
DATED : May 28, 2019
INVENTOR(S) : Jiantao Xue et al.

Page 1 of 1

It is certified that error appears in the above-identified patent and that said Letters Patent is hereby corrected as shown below:

In the Claims

In Column 32, Line 25:
In Claim 6, delete "appreciated" and insert -- aggregated --, therefor.

In Column 34, Line 4:
In Claim 11, delete "appreciated" and insert -- aggregated --, therefor.

Signed and Sealed this
Nineteenth Day of November, 2019

Andrei Iancu
*Director of the United States Patent and Trademark Office*